Figure 1:
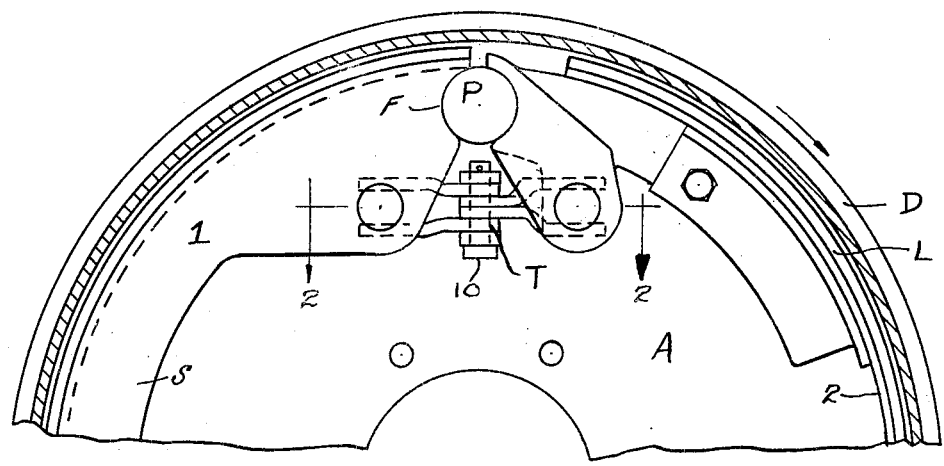

Dec. 9, 1930.  J. SNEED  1,784,395
BRAKE STRUCTURE
Filed July 7, 1928  2 Sheets-Sheet 1

Dec. 9, 1930.    J. SNEED    1,784,395
BRAKE STRUCTURE
Filed July 7, 1928    2 Sheets-Sheet 2

John Sneed, Inventor

Patented Dec. 9, 1930

1,784,395

UNITED STATES PATENT OFFICE

JOHN SNEED, OF FERNDALE, MICHIGAN, ASSIGNOR TO THE MIDLAND STEEL PRODUCTS COMPANY, OF CLEVELAND, OHIO, A CORPORATION OF OHIO

BRAKE STRUCTURE

Application filed July 7, 1928. Serial No. 290,955.

This invention relates to vehicle brakes and particularly to the toggle mechanism for actuating the brakes.

When a toggle is used as a spreading mechanism for a brake, it will be appreciated that the toggle and its actuating mechanism may well be arranged so that the toggle can not pass over dead center during application of the brake since the passing of the toggle beyond dead center releases the braking pressure. Various devices have been employed to limit the travel of the toggle. For instance in my copending application Serial No. 30,459 filed May 15th, 1925, I have provided an abutment for engaging the yoke which was connected with the pivot pin of the toggle so that the pivot point could not be moved across dead center. However, if a rigid linkage is employed between several brakes on different wheels, and fixed stops are associated with each toggle, there is the danger that one toggle may come upon its stop and tend to prevent further application of the other brakes.

The pitch of the toggle in its working range might be made high so that the toggle would not be drawn near dead center under any conditions, but such an arrangement involves a loss of mechanical advantage, which I desire to retain in my present invention.

It is among the objects of my invention to arrange the toggle spreading mechanism between the ends of an internal expanding brake which can be normally operated at a high mechanical advantage close to its dead center position without danger of the toggle passing dead center and collapsing. Another object is to arrange at least one secondary point of contact for at least one end of the toggle which will come into operation as the toggle approaches its primary position at dead center so that a secondary position of dead center will be established when the primary position is passed. Another object is to change the mechanical advantage of the toggle from a high mechanical advantage as it approaches its primary point of dead center to a lesser mechanical advantage with a corresponding increased shoe travel from a given increment of pedal depression.

A still further object is to arrange a plurality of brakes on a motor vehicle with each actuated by similar toggles so that the toggles may assume like positions in each brake at the same time to cause equal braking effects in all of the brakes.

Another object is to arrange the toggles in several brakes so that the brake requiring the greatest spreading travel may have it without interfering with the brakes requiring less travel. A further object is to arrange the spreading mechanism in the several brakes so that if through maladjustment or wear one of the toggles is drawn past its primary dead center, all of the toggles may be continued to be spread while the first one is approaching its secondary dead center at a reduced mechanical advantage.

Other objects will appear from the following description of my invention, reference being had to the accompanying drawings illustrating a preferred form thereof. The essential characteristics are summarized in the claims.

Figure 2:
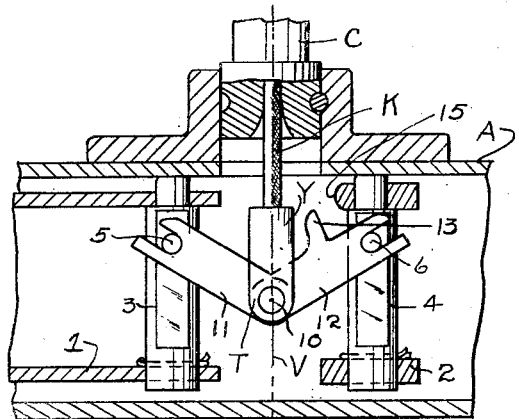
Figure 3:
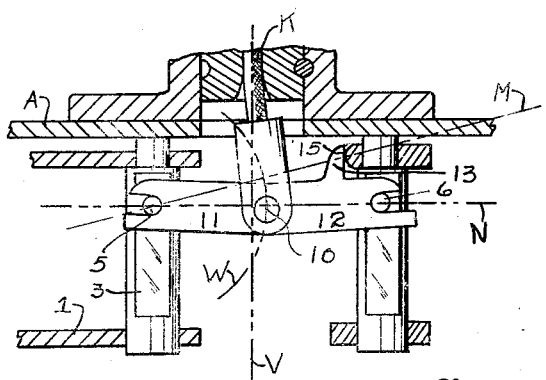
Figure 4:
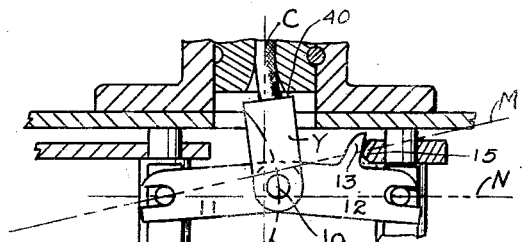
Figure 5:
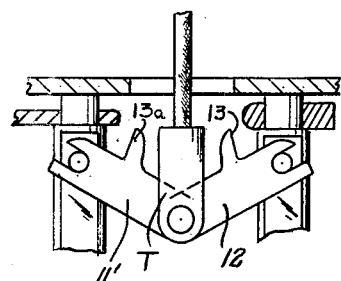
Figure 6:
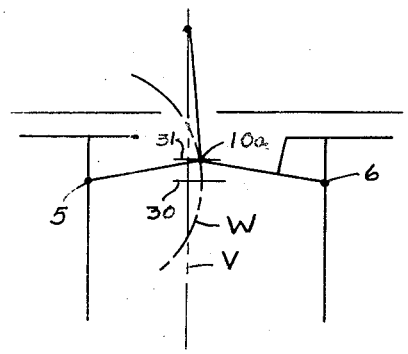
Figure 7:
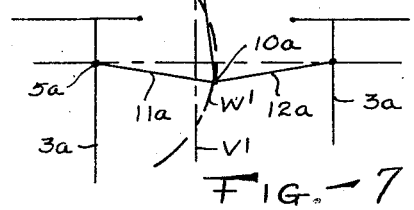
Figure 8:
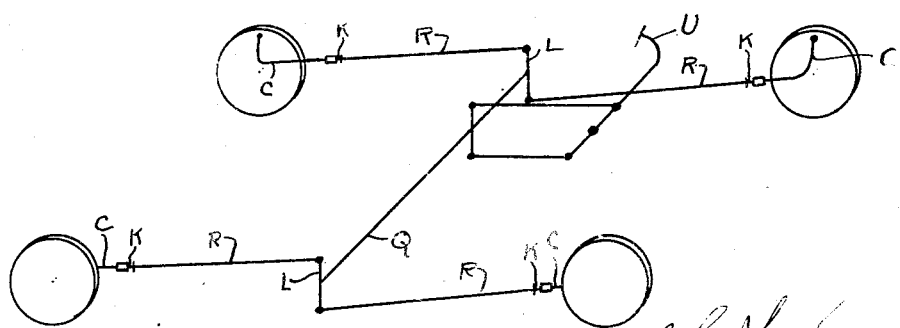

In the drawings, Fig. 1 is a partial elevation of the brake assembly; Fig. 2 is a section taken along the line 2—2 of Fig. 1; Fig. 3 is a view similar to Fig. 2 with a toggle assuming position more nearly primary dead center; Fig. 4 is a similar view illustrating the toggle in position beyond its primary dead center; Fig. 5 is a view similar to Fig. 2 showing a modified form of my invention; Fig. 6 is a diagrammatic illustration of the angular relation of the parts illustrated in Figs. 2 and 3; Fig. 7 is a diagrammatic illustration of a toggle not embodying the feature of my invention and illustrating the angular relation of parts; Fig. 8 is a diagrammatic illustration of the hook-up or linkage employed to actuate the brakes on the several wheels of a motor vehicle.

Referring particularly to Fig. 1, I choose to illustrate my invention in the environment of a well known brake which includes a full floating internal expanding brake shoe having an anchor between the ends of the shoes and having a toggle spreading mechanism between the same ends. There is shown the usual apron or backing plate A carrying an anchor pin P which apron closes the open face of a brake drum D. Within the drum and abutting the anchor is a shoe S which may comprise a served part 1 and a servo part 2. In the usual forward motion of the vehicle the drum turns clockwise as indicated by the arrow and in the usual application of the brake the servo part of the shoe 2 is expanded away from the anchor pin while the served part of the shoe 1 delivers the braking torque to the anchor pin along anchor engaging surfaces F.

To spread the ends of the shoe a toggle T is provided, which is universally connected at its ends to the ends of the shoes and has a pivot pin 10 which is drawn toward the backing plate to expand the toggle. Referring also to Fig. 2, the pivot pin 10 may be engaged by a yoke Y which embraces a cable K. The cable K extends through an aperture in the apron and is drawn by tension exerted normal to the apron extending in the direction of the line V and may be guided in a flexible conduit C.

Referring particularly to Fig. 8, I illustrate diagrammatically a rigid linkage including conduits C, one of which is associated with each brake. The cables K pass through each of the conduits and are connected with pull rods R. The fore and aft pull rods are connected respectively to opposite ends of levers L which are secured to a rotating cross shaft Q. The shaft Q may be rotated by such means as a manually controlled pedal U. Such a linkage or hook-up is rigid as distinguished from mechanism having equalizing devices between the several brakes. I wish to illustrate my invention in connection with a rigid linkage wherein a given depression of the foot pedal causes like amounts of travel for each of the cables K and for at least the pivot points of all of the toggles in the several brakes.

Referring back to Fig. 2, the ends of the shoes 1 and 2 pivotally carry pins 3 and 4 which extend parallel with the anchor pin P. Each of the pins 3 and 4 carry vertically extending pins 5 and 6 which are engaged by bifurcated ends of the toggle. The toggle may comprise levers 11 and 12 arranged so that the lever 11 engages the pin 5 and the lever 12 engages the pin 6.

Formed integrally with the lever 12 is an arm 13 which extends generally at right angles to the lever in a direction toward the apron and which engages the point 15 on the served end of the shoe as the toggle approaches the position of dead center. Referring to Fig. 3 the arm 13 is illustrated in contact with the end of the shoe at 15 which may be regarded as the point of secondary contact for one end of the toggle. It will be noted in Fig. 3 that the pivot pin 10 of the toggle is approaching the primary dead center line N drawn through the pins 5 and 6, when contact is established at the point 15. At this time the toggle receives a new and secondary line of dead center M drawn through the points 5 and 15. After establishing the secondary line of dead center M the pivot pin 10 may continue to be drawn toward the apron without danger of the toggle collapsing. It is also to be noted that when contact is made at the point 15 that the effective mechanical advantage of the toggle is sharply reduced.

If through maladjustment or excessive wear of one of the brakes its toggle passes primary dead center when all of the brakes are being applied, that toggle will act in its secondary zone and that toggle will be acting at a relatively high angle or pitch while the other toggles are approaching primary dead center and acting at a relatively low angle or pitch. Under such conditions if the cables K are all drawn equal amounts, the ends of the shoe in the most worn brake will be expanded the greatest amount, the result being that in the face of maladjustment or excessive wear in one or more of the brakes that substantially equal braking effects will be had on all four wheels.

When the ends of the shoe repose on the anchor in idle position, the toggle assumes the position shown in Fig. 2 with the pivot pin 10 lying in the line V. As the shoe ends are spread when the drums rotate clockwise as viewed in Fig. 1, the pivot pin 10 follows an arc W drawn about the point 5 as a center. It will be observed in Fig. 3 that the yoke Y is inclined from the line V a maximum angle when the point 10 crosses the line N. It will be appreciated that it is desirable to keep this deviation as small as possible during the operation of the brake. Referring to Fig. 4 it will be observed as the toggle passes into its secondary zone that the point 10 continues to follow the arc W and comes closer to the line V. I have illustrated this diagrammatically in Fig. 6 wherein the greatest deviation of the point 10 from the line V is indicated at 30 and a lesser deviation indicated at 31.

Referring to Fig. 7, I have indicated diagrammatically a simple toggle not embodying the principle of my invention in which the levers 11a and 12a are necessarily longer than the levers 11 and 12 to spread the pins 3a and 4a a distance equal to the spreading illustrated in Fig. 4. It will be observed in this figure that the pivot pin 10a follows the arc W' and deviates a greater amount from the line V' than it does as illustrated in either Figs. 4 or 6.

Referring back to Fig. 4, I show the pivot point 10 approaching the secondary dead center and prior to its extreme position I provide that the yoke Y will contact at its inner end with the end of the conduit as at 40. As mentioned above, this relation is shown in my copending application and I only contemplate this condition to exist under the most extraordinary circumstances and provide this arrangement in my present invention in contemplation of emergencies.

Referring particularly to Fig. 5 I show a modified form of my invention wherein the toggle has a lever 12 with an arm 13 and wherein the lever 11' has a similar arm 13a. The operation of such a toggle would be in all respects similar to the toggles described above except that the angular and bodily movement of the yoke Y would not be reduced during the application of the brakes in the usual forward movement of the vehicle as it is in the preferred form of my invention, as illustrated for instance in Fig. 4.

From the foregoing it will appear that I have provided a spreading mechanism for a brake which has a high safety factor and insures the uniform action of a plurality of brakes and distributes braking load among several brakes including those excessively worn or poorly adjusted. While I have illustrated and described a preferred form of my invention and shown it in connection with a particular type of brake and associated with a rigid linkage, I do not care to be limited in the scope of my patent thereby or in any manner, other than by the claims appended hereto.

I claim:—

1. Toggle spreading mechanism comprising a pair of levers pivoted together, one of said levers having a normally idle arm adapted to include the fulcrum point for one end of the toggle when the pivot point of the toggle approaches the line which joins the normally operative ends of the toggle.

2. The combination of a toggle comprising a pair of levers pivoted together, pins normally engaged by the ends of the toggle, a member associated with one of said pins, an arm associated with one of said levers and adapted to engage said member as the toggle approaches the position of dead center.

3. A toggle comprising a pair of levers pivoted together, one of said levers having an arm, in combination with means engaged by one end of the toggle, said means having a part engageable by said arm as the toggle approaches primary dead center and means for pulling the pivot point of said toggle and moving said first named means until said arm engages said part, whereby a secondary line of dead center is established toward which the pivot point may be drawn without collapsing the toggle.

4. Toggle spreading mechanism comprising a pair of levers of which at least one of the levers has an arm extending in the plane of action of the toggle and in the direction of motion of the levers when the toggle is flattened in combination with a member engaged by said lever having a part positioned in the path of movement of said arm adapted to engage said arm at a point opposite from the pivot point of the toggle whereby said lever normally fulcrums upon said member and has a secondary fulcrum point where the arm engages said part.

5. Toggle spreading mechanism for the ends of a brake shoe including a pair of levers having their inner ends pivoted together at the pivot point of the toggle and having their outer ends engaging opposite ends of the brake shoe, said outer ends having a plurality of points engageable with the said shoe ends, whereby a line drawn through a pair of such points determines the primary dead center of the toggle and a line drawn through a different pair of such points determining the secondary dead center for said toggle.

6. Toggle spreading mechanism including a pair of arms having their inner ends pivoted together and constituting the pivot point for the toggle and having primary fulcrum bearing points at their outer ends, said arms having additional and secondary bearing points at their outer ends which determine a secondary position of dead center for the toggle along a line parallel to the line of primary dead center.

7. In a brake, a friction device having a part movable into engagement with the brake drum, toggle mechanism for moving said part including a lever pivotally connected with said part, said lever having an arm spaced from said part when the brake is idle and movable into engagement with said part at least when the toggle is flattened.

8. In a brake, a friction device having a part movable into engagement with the brake drum, toggle mechanism including a lever pivotally and slidably connected with said part at one point, said lever having an arm spaced from said part when the brake is idle and movable into engagement with said part at a point spaced from the first point at least when the toggle is flattened and establishing a different pitch for the toggle at the moment of engagement.

9. In a brake, the combination of a friction device, a toggle for actuating said friction device having a lever connected with at least one end of the friction device, a fulcrum pin carried by the end of the friction device and engageable with the end of said lever, said lever having an arm normally spaced from the end of the said friction device and movable into engagement therewith as the toggle is flattened, said arm contacting with the end of said friction device and establishing a secondary point of contact for the toggle whereby the end of the friction device may be moved by pressure exerted through said arm after the end of said lever ceases to engage said pin.

10. In a brake the combination of a shoe having an anchored end and a free end, thrust pins carried by the ends of the shoe, a toggle for spreading the ends of the shoe comprising a pair of levers having their inner ends connected together with their outer ends engaging said thrust pins, the lever associated with the free end of the shoe having an arm engageable with the free end of the shoe when the toggle is flattened and means for flattening the toggle.

11. In a brake the combination of a shoe having an anchored end and a free end, an apron having an opening adjacent the ends of the shoe, a toggle for spreading the ends of the shoe apart and disposed in the plane normal to said apron, said toggle normally having one point of contact with each end of the shoe which points determine the line of primary dead center for the toggle, said toggle having a projecting part near the free end of the shoe extending toward the apron and adapted to engage the free end of the shoe at least when the pivot point of the toggle approaches the line of primary dead center, said part contacting with the free end of the shoes at a point which establishes a line of secondary dead center and means extending through the opening in said apron and connected with the pivot point of said toggle for drawing the pivot point through its line of primary dead center toward the line of secondary dead center.

12. In a brake the combination of a shoe having an anchored end and a free end, an apron having an opening adjacent the ends of the shoe, a toggle for spreading the ends of the shoe apart and disposed in a plane normal to said apron, said toggle normally having one point of contact with each end of the shoe which points determine the line of primary dead center for the toggle, said toggle having a projecting part near the free end of the shoe extending toward the apron and adapted to engage the free end of the shoe at least when the pivot point of the toggle approaches the line of primary dead center, said part contacting with the free end of the shoes at a point which establishes a line of secondary dead center and means extending through the opening in said apron and connected with the pivot point of said toggle for drawing the pivot point through its line of primary dead center toward the line of secondary dead center, and means for limiting the travel of the toggle short of the line of secondary dead center.

13. In a brake the combination of a friction device, toggle mechanism for actuating said friction device, said toggle mechanism having a primary zone of operation of increasing mechanical advantage and a secondary zone of operation entered into when the toggle approaches the position of highest mechanical advantage in its primary zone, the initial mechanical advantage in the secondary zone being substantially less than the final mechanical advantage in the primary zone, and means for moving said toggle to actuate the brake.

14. In a brake the combination of a friction device having adjacent ends, toggle mechanism connected in said ends for expanding the friction device, said toggle mechanism normally having one point of contact with one end of the shoe and one point of contact with the other end of the shoe and also having an auxiliary point of contact with at least one end of the shoe made when the toggle approaches a line joining the first named points of contact whereby in a given position the toggle has two points of contact at one end of the shoe which are spaced apart, the auxiliary point of contact changing the effective pitch of the toggle when the spreading force is delivered through that point.

15. In a brake the combination of an apron, a friction device having separable ends, and toggle mechanism for spreading said ends, said toggle comprising a pair of levers having their inner ends pivotally connected and having their outer ends normally engaging opposite ends of said friction device, each of said levers having arms projecting toward the apron and in the direction of active motion of the toggle, said arms being engageable with opposite ends of said friction device at least when the toggle is flattened, whereby additional points of contact are established for the ends of the toggle to permit further movement thereof.

16. Toggle spreading mechanism for a brake comprising a pair of levers pivoted together, at least one of said levers having a normally idle portion positioned to include the fulcrum point of one part of the toggle when the toggle approaches dead center and thereby establish a new zone of operation beyond the original dead center.

17. Toggle spreading mechanism including a pair of arms having their inner ends pivoted together and constituting the pivot point for the toggle and having fulcrum bearing points at their outer ends, said arms having additional secondary bearing points which determine a secondary position of dead center for the toggle.

18. A toggle spreading mechanism according to claim 17 wherein at least one of said arms has a sliding as well as pivotal connection at one of said points.

19. In a brake having a friction device with separable ends the combination of a toggle having arms connected together at their near ends forming the pivot point of the toggle and connected at their far ends to the ends of the friction device, means whereby the pivot point is drawn in to line with the ends of said arms to a position of primary dead center, and means for establishing a secondary position of dead center whereby said pivot point may be drawn beyond the primary point of dead center without collapsing the toggle.

20. The combination according to claim 19 with means for limiting movement of said pivot point between the positions of primary and secondary dead center.

In testimony whereof, I hereunto affix my signature.

JOHN SNEED.